Jan. 27, 1948.        C. W. EARP        2,434,914
FREQUENCY INDICATING CATHODE RAY OSCILLOSCOPE
Filed March 13, 1943
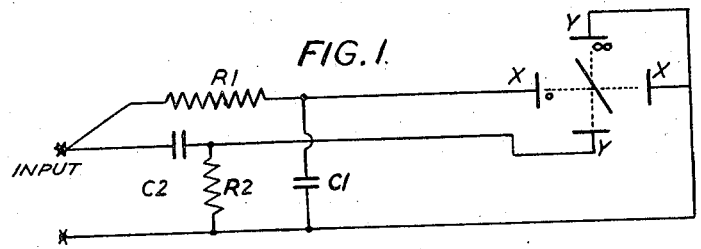
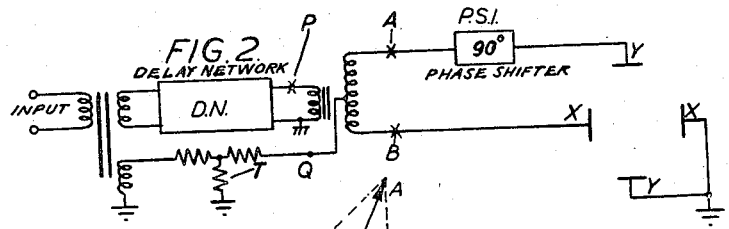
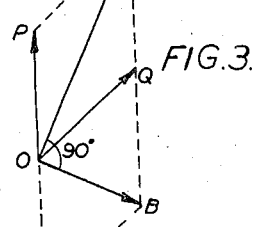
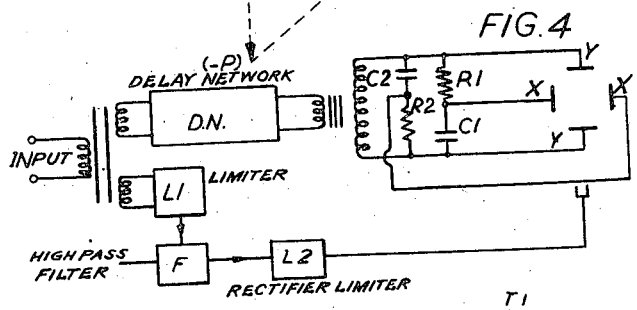
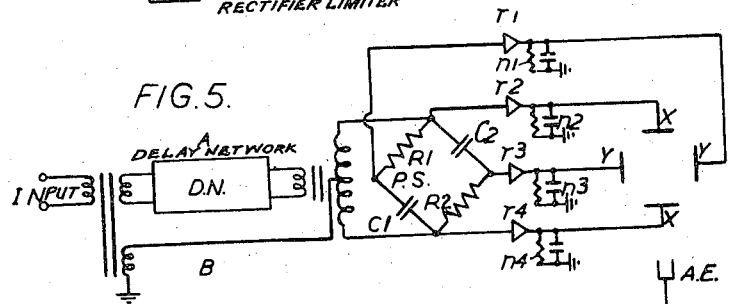
Inventor
C. W. Earp.
By Loyd Hall Sutton
Attorney Patented Jan. 27, 1948

2,434,914

UNITED STATES PATENT OFFICE 2,434,914

FREQUENCY INDICATING CATHODE-RAY OSCILLOSCOPE

Charles William Earp, London W. C. 2, England, assignor to Standard Telephones and Cables Limited, London, England, a British company Application March 13, 1943, Serial No. 479,123
In Great Britain April 21, 1942

9 Claims. (Cl. 172—245)

The present invention relates to arrangements for measuring the frequency of a signal and has for its object to provide arrangements for giving a clear and automatic indication of the frequency of the signal, and in particular on the screen of a cathode ray oscillograph.

In arrangements for measuring the frequency of the signal according to the present invention the signal is applied to two electrical paths either or both of which include means for producing a frequency responsive differential distortion of a characteristic of the signal in the outputs of the two paths, the outputs of the two paths being applied to a measuring instrument to measure the said differential distortion and thereby to obtain an indication of the frequency.

In one way of carrying the invention into effect a signal is applied to two electrical paths either or both of which include means for producing a phase distortion in accordance with the frequency so as to produce a phase difference in the outputs of the two paths depending upon the frequency, the outputs of the two paths being applied to a measuring instrument to obtain a measurement of the said phase difference of the frequency in the outputs of the two paths and thereby an indication of the frequency.

In another arrangement for carrying out the invention in practice the signal is applied equally to two electrical paths either or both of which include means for producing an amplitude distortion in accordance with the frequency so as to produce a difference level in the outputs of the two paths depending upon the frequency, the outputs of the two paths being applied to a measuring instrument to obtain a measurement of the difference in levels of the outputs from the two paths and thereby an indication of the frequency.

The invention will be better understood from the following description taken in conjunction with the accompanying drawings in which Figures 1, 2, 4 and 5 show schematically embodiments of the invention, and Figure 3 is a vectorial digram used in the description of Figure 2.

Figure 1 shows one elementary manner in which the invention may be carried out. The signal of unknown frequency is fed into two electrical paths or two networks composed of resistance $R_1$ and capacity $C_1$ and resistance $R_2$ and capacity $C_2$ respectively. Now, over the frequency band under consideration, it is arranged that $C_1$ shall have a small reactance compared with the resistance $R_1$, and that $C_2$ shall have a large reactance compared with the resistance $R_2$.

In one path, therefore, the phase of the signal is advanced 90° at all frequencies and in the other path, the phase is retarded 90° at all frequencies. The two outputs are therefore always anti-phase, and when applied to the deflecting plates X and Y of a cathode ray oscillograph, produce a straight line trace on the screen.

The network $R_1C_1$ has an amplitude distortion of 6 db. per octave of frequency, with high attenuation at the high frequencies, whereas network $R_2C_2$ has the opposite type of distortion. The straight line trace of the oscillograph therefore has different annular positions for different frequencies, and turns through 90° over the frequency range from zero to infinite.

This system suffers from the defects that the frequency-scale of the oscillograph is not linear, and that the length of the trace varies over a wide range for constant signal input levels of different frequency. Furthermore, only 90° of rotation of trace is obtainable.

Figure 2 shows schematically an arrangement in which complete rotation, or even multiple rotation of trace can be achieved. Furthermore, rotation is linear with frequency and trace amplitude is constant.

The signal is fed into two paths, one including a delay network DN and the other path includes an attenuating pad T to adjust the outputs of the two paths to equal amplitudes. The phase of one output with respect to the other rotates uniformly with frequency by virtue of the phase distortion introduced by the delay network DN.

These two equal amplitude outputs are now combined as shown so as to produce at A an output equal to the vectorial sum of the outputs from the two paths, and at B an output equal to the vectorial difference in outputs from the two paths. The two outputs at A and B are both variable in amplitude with frequency, but are always in quadrature with each other as will be observed from Figure 3.

In Figure 3 the vector OQ represents the signal amplitude in the path Q, Figure 2 and OP represents the signal amplitude in the path P, Figure 2. The vectorial sum of OP and OQ is thus represented by OA, and the vectorial difference by OB.

Output A (or B) is now subjected to an aperiodic phase shift of 90° in the phase shifter $PS_1$. The two outputs A and B are thus rendered always in-phase or anti-phase, and can be applied to a cathode ray oscillograph to give a line indication for all frequencies.

The "aperiodic phase-shift" may be a network comprising a simple resistance and condenser unless a very broad band of frequencies is under examination.

The oscillograph trace rotates through 180° for a frequency change equal to the inverse of the "delay" in seconds introduced by the delay network DN, and rotates uniformly with frequency over the frequency band over which the delay network and phase-shifter operate.

To give a practical example, the delay network may be composed of 8 coupled tuned circuits, each tuned to 1000 cycles/second, giving a filter bandwidth of 100 cycles and a delay of 1/50 second. A simple resistance and condenser can give a suitable "aperiodic" phase shift of 90° over the band 950 to 1050 cycle/second. The oscillograph trace now rotates over 360° for a frequency shift from 950 cycles, progressing to 1050 cycles.

Figure 4 shows indicating arrangements which do not involve the use of a delay network with very small amplitude distortion, neither do they require the level balancing pad T.

In one path the signal at INPUT is passed through a delay network DN, and is then phase-split by a resistance-capacity phasing network R1, C1, R2, C2 as shown to provide a circular trace on the oscillograph screen. (In the phasing network, resistances R1, R2 and condensers C1, C2 have substantially equal impedances over the frequency band passed by the delay network.)

The other path comprises an amplitude limiter L1 which produces a square wave-form which in turn is applied to a high-pass filter F to produce a succession of short sharp pulses, alternatively positive and negative. Either the positive or the negative pulses are removed by a unidirectional limiter L2, which may be a single-element rectifier, before application to a control electrode of the cathode ray oscillograph.

The control electrode may be a focusing electrode, when the circular trace may be brought into focus only at one point, corresponding to the frequency of the signal and thus giving a bright spot. Alternatively, the deflection sensitivity of the oscillograph may be modulated by the pulse train, when a sharp radial kink is produced as indication on the circular trace. Such operation of a cathode ray oscillograph is well known and requires no further description herein.

In this arrangement the position of the indication rotates through 360° for a frequency change in cycles/second equal to the inverse of the amount of delay in seconds.

Figure 5 shows a still further arrangement for obtaining an indication. Here, the signal from IN is passed in one path A through a delay network DN and is then fed to a phase splitting network PS of a known type and comprising resistance R1 and capacity C1 and resistance R2 and capacity C2 as shown. Four phases obtained from each corner of the network progress in equal steps at 90°. Each output is combined with non-delayed signal from path B and applied to separate rectifiers $r_1 \ldots r_4$. The four rectified outputs are applied to respective plates X, X, Y, Y of a cathode ray oscillograph, the plate positions corresponding to the four phases of the delayed signal. The voltage for the deflection plates are obtained from resistance-capacity-time circuits $n_1—n_4$ as shown, which function to integrate the effect of the signal, which may be of a pulsating nature and apply steady deflecting forces to the electrodes X and Y.

It will be observed that the arrangement comprises in effect two differential detectors, firstly comprising the rectifiers $r_2$ and $r_4$ and secondly the rectifiers $r_1$, $r_3$, but the inputs to which from path A are displaced by 90° with respect to the inputs of rectifiers $r_2$, $r_4$ respectively. The differential output from $r_2$, $r_4$ will consequently be different from the differential output from $r_1$, $r_3$ and the difference of these outputs will depend upon the phase distortion produced in the delay network DN. The time circuits $n_1—n_4$ consisting of resistance and capacities in parallel integrate the outputs from the rectifiers and give steady voltage outputs. The spot on the oscillograph screen takes up a position depending upon the relative potential differences applied to the X and Y deflecting plates of the oscillograph, and as the phase difference between the signals in the paths A and B varies, the spot will deflect angularly, the deflection being a measure of the phase difference and hence the frequency.

In order to produce a line trace which rotates angularly with changes of frequency, the deflection sensitivity of the oscillograph may be modulated at a frequency sufficiently high to avoid producing closed figure traces. For example, an alternating voltage of suitable frequency may be applied to an accelerator electrode indicated at AE.

The arrangements hereinbefore described for indication of frequency can be conveniently used in an obstacle detector of the type which utilises a frequency-swept radio transmission. The arrangements are particularly useful in the case of the radio altimeter of the type specified, when the ground reflection dominates over all other signals, and the beat between transmitted and received signals corresponds to the distance from the ground.

The simple indicator described in connection with Figure 1 can be used as an accurate frequency counter for such a distance measuring equipment. In cases where a wide range of distances needs to be covered, a high reading accuracy may be obtained by switching to different ranges, using the most suitable phasing networks for each range.

The arrangements described in relation to Figures 2, 4 and 5 require a wide-band 90° phase shifter. Such a phase shifter can be provided by modulation of an oscillator by the signal beat frequency, selection of one sideband of modulation, and beating down the sideband by the same oscillator suitably phased.

Arrangements according to the invention utilising differential delay networks are also applicable for giving an indication of a frequency change in a train of pulses received in any system utilising pulses. For instance the pulses received may be the pulses after reflection from a moving obstacle, in an obstacle detector which uses radio pulses, and hence an indication of the relative velocity of the obstacle with respect to the detector is obtained.

The received pulses are first converted to a suitable intermediate frequency and are then applied to a delay network having a delay equal to the normal or transmitted pulse repetition period. If, now, the obstacle is moving, the corresponding reflection wave increases or decreases in frequency by the "Doppler" frequency, and such frequency displacement is recorded on the oscillograph. A stationary obstacle, which produces pulses of the normal repetition period is indicated as a deflection along a predetermined radial line and moving obstacles give a variable pulse frequency according to their relative velocities with consequent positive or negative deflection angle relative to said predetermined line. The system is, therefore, a complete "velocity analyser."

In applications of the inventions in which the signal is known to have a repetitive characteristic at a particular periodicity, it is of advantage to make the differential delay of the two paths A and B equal to one (or a multiple) of the normal period of the repetition. By this means, the cathode ray deflection, for example Figure 5, rotates one revolution (or a multiple number of revolutions) for a frequency change equal to the normal repetition frequency. If a Fourrier analysis of the signal wave form be made, it will be found that each frequency component of the signal conspires to deflect the cathode ray beam in the same direction. If the signal is a series of sharply defined pulses, the cathode ray oscillograph indication may be a series of sharp kinks or bright spots depending upon the particular application of the signals from the two paths A—B to the cathode ray tube deflecting electrodes as described hereinbefore. Alternatively, the sharp pulses may be smoothed out by low pass filters as for example in the case of $n_1$—$n_4$ of Figure 5, to provide steady deflecting forces to the deflecting electrodes XY.

It is often difficult to interpolate accurately between two fixed stable-frequency waves produced by a frequency standard. The arrangements described in relation to Figures 2, 4 and 5 may be used to make such interpolation simple and accurate.

The indication can be arranged to give any desired angle of rotation from one fixed frequency to the other, and application of the intermediate frequency to be measured gives an intermediate angle of deflection on a calibrated scale.

Whilst specific embodiments of the invention have been described by way of example, many variations and modifications thereof will occur to those skilled in the art without departing from the invention as defined in the appended claims.

What is claimed is:

1. A frequency measuring arrangement comprising an input circuit adapted to be supplied from a variable frequency current source under measurement, a cathode ray oscillograph comprising a fluorescent screen and elements for controlling the path of a luminous trace on said screen, control circuits for applying potentials to said last-mentioned elements, a pair of parallel electrical paths coupled between said input circuit and said control circuits, and a phase distorting network comprising a resistance-capacity delay network in at least one of said paths for producing a phase difference in the outputs of said two paths.

2. A frequency measuring arrangement comprising an input circuit adapted to be supplied from a variable frequency current source under measurement, a cathode ray oscillograph comprising two pairs of beam deflecting elements, a pair of parallel electrical paths coupled between said input circuit and said respective pairs of deflecting elements, a phase distorting network in one path having increasing attenuation with increasing frequency and arranged to advance the phase of signals 90° at all frequencies, and a phase distorting network in the other path having decreasing attenuation with increasing frequency and arranged to retard the phase of signals 90° at all operating frequencies.

3. A frequency measuring arrangement according to claim 2, wherein the said network in one path comprises a series resistor and shunt capacity, said capacity having a small reactance compared with that of said resistor at operating frequencies, and said network in the other path comprises a capacity in series and a resistor in shunt, said last-mentioned capacity having a large reactance compared with that of said last-mentioned resistor at operating frequencies.

4. A frequency measuring arrangement comprising an input circuit adapted to be supplied from a variable frequency current source under measurement, a cathode ray oscillograph comprising a fluorescent screen and elements for controlling the path of a luminous trace on said screen, control circuits for applying potentials to said last-mentioned elements, a pair of parallel electrical paths coupled between said input circuits and said control circuits, a phase distorting network in at least one of said paths for producing a phase difference in the outputs of said two paths dependent upon frequency, and an attenuating network in at least one of said paths for equalizing the signal amplitudes in the two paths at all operating frequencies.

5. A frequency measuring arrangement according to claim 4, wherein a delay network which produces phase distortion linear with frequency is included in one said path and an attenuating network which equalizes the output signal amplitudes in the two paths is included in said other path.

6. A frequency measuring arrangement according to claim 4, wherein a delay network is included in one said path and an attenuating network in the other said path, means is provided in said coupling circuits for adding and subtracting the outputs of the two paths vectorially to obtain sum and difference outputs, and phase shifting means is provided in said coupling circuits for subjecting one of said last-mentioned outputs to a phase shift of 90°.

7. A frequency measuring arrangement comprising an input circuit adapted to be supplied from a variable frequency current source under measurement, a cathode ray oscillograph comprising a fluorescent screen, two pairs of beam deflecting elements, and a control electrode for controlling the intensity of the fluorescent spot, a phase-splitting network having an input circuit and two output circuits one of which is connected to one said pair of beam deflecting elements and the other to the other pair of beam deflecting elements, a first electrical path including a delay network coupled between said first-mentioned input circuit and the said input circuit of said phase-splitting network, a second electrical path coupled between said first-mentioned input circuit and said control electrode, and means in said second path for producing electrical pulses of short duration and of frequency corresponding to the frequency under measurement.

8. A frequency measuring arrangement according to claim 7 wherein said second path includes in the order named proceeding from its input an amplitude limiter for producing a square wave form, a high-pass filter for producing a succession of alternately positive and negative sharp pulses, and a rectifier.

9. A frequency measuring arrangement comprising an input circuit adapted to be supplied from a variable frequency current source under measurement, a cathode ray oscillograph as an indicating device, said cathode ray oscillograph comprising a fluorescent screen and elements for controlling the path of a luminous trace on said screen, said control elements consisting of two pairs of beam deflecting elements and a control element adapted to control the focus of the luminous trace, a pair of parallel electrical paths coupled between said input circuit and said control circuits and a phase distorting network comprising a resistance-capacity delay network in at least one of said paths for producing a phase difference in the output of said two paths at all operating frequencies.

CHARLES WILLIAM EARP.

REFERENCES CITED

The following references are of record in the file of this patent:

UNITED STATES PATENTS

| Number | Name | Date |
| --- | --- | --- |
| 2,093,204 | Miyazaki | Sept. 14, 1937 |
| 2,233,751 | Seeley | Mar. 4, 1941 |
| 2,134,716 | Gunn | Nov. 1, 1938 |
| 2,261,272 | Newhouse | Nov. 4, 1941 |
| 2,323,609 | Kihn | July 6, 1943 |
| 2,254,023 | Wright et al. | Aug. 26, 1941 |
| 1,663,086 | Long | Mar. 20, 1928 |